350-169 CROSS REFERENCE SEARCH ROOM

OPTICAL SYSTEM FOR COLOR TELEVISION CAMERA

Filed May 27, 1964 4 Sheets-Sheet 1

INVENTOR.
FRANK G. BACK
BY Albert F. Kronman
ATTORNEY

INVENTOR.
FRANK G. BACK
BY Albert F. Kronman
ATTORNEY

OPTICAL SYSTEM FOR COLOR TELEVISION CAMERA

Filed May 27, 1964

INVENTOR.
FRANK G. BACK
BY Albert F. Kronman
ATTORNEY

INVENTOR.
FRANK G. BACK
BY Albert F. Kronman
ATTORNEY 3,333,053
OPTICAL SYSTEM FOR COLOR TELEVISION CAMERA
Frank G. Back, 55 Sea Cliff Ave., Glen Cove, N.Y. 11579
Filed May 27, 1964, Ser. No. 370,639
12 Claims. (Cl. 178—5.4)

This invention relates to television cameras and more specifically to lens assemblies for use in color television cameras.

In deriving the signals for the transmission of color television programs it has been the practice to extract from the light coming through the camera lenses, by means of filters, the primary light colors of the scene being televised. Each of the filtered scenes are then received within a separate image-orthicon tube and thereafter transmitted to the receiving television sets. In order to improve the brilliance, sharpness and overall quality of the television picture it has also been found desirable to simultaneously transmit a black and white signal of the same scene. The black and white information is best received within an orthicon tube inasmuch as this type of tube produces a higher quality black and white picture. The color filtered information may be received by the smaller vidicon tubes. However, in order to incorporate all of these tubes within a camera housing large requirements of space are essential. In addition, the camera becomes unwieldly and difficult for camera men to work with.

In a patent issued to Frank G. Back, for Varifocal, Long Back Focal Lens, for Color Television on February 7, 1961, No. 2,971,051, it was shown that the use of a varifocal lens with a long back focal lens permitted the interposition of certain prisms and color filters within a color television camera which greatly improved the overall characteristics of the camera. The present invention constitutes an improvement on the aforesaid patent.

Accordingly, it is an object of the present invention to provide lens assemblies for color television cameras which are superior to those heretofore known in the art.

Another object of the present invention is to provide color television lens assemblies which are compact and lend themselves to incorporation within a single housing.

Another object of the present invention is to provide a lens assembly which will produce high quality television images.

Another object of the present invention is to provide a color television camera which will incorporate a plurality of vidicon, orthicon or any other image transmitting tubes in a compact housing.

A feature of the present invention is the use of a long back focal length lens together with prisms to provide novel arrangements of orthicon and vidicon tubes within a color television camera.

Another feature of the present invention is its use of a modified Petzval lens system within a color television camera.

Another feature of the present invention is its lens system which results in a minimum amount of light loss and a maximum amount of resolution by the television camera.

Another feature of the present invention is its adaptability whereby color receiving tubes can be added to a black and white camera if desired.

The invention consists of the construction, combination and arrangement of parts, as herein illustrated, described and claimed.

In the accompanying drawings, forming a part hereof there are illustrated several forms of embodiment of the invention, in which drawings similar reference characters designate corresponding parts, and in which.

Figure 1:
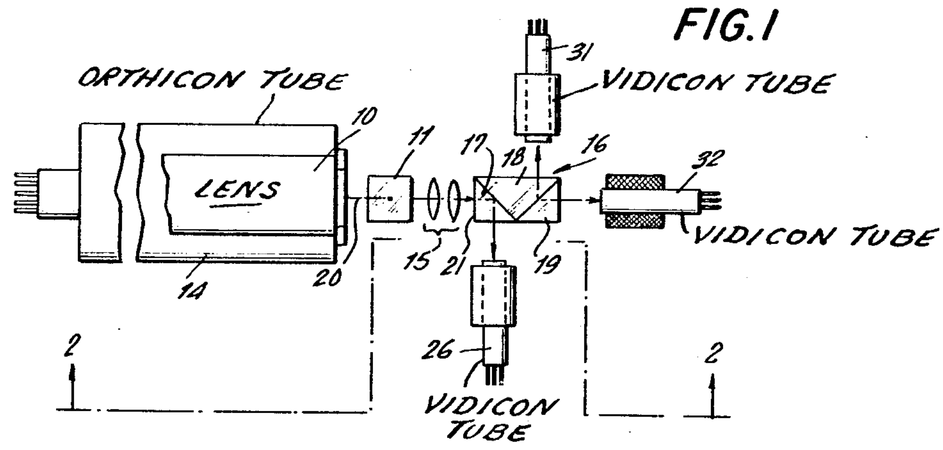
FIGURE 1 is a somewhat diagrammatic top plan view of one form of a color television camera made in accordance with the present invention.
Figures 2, 3, 12:
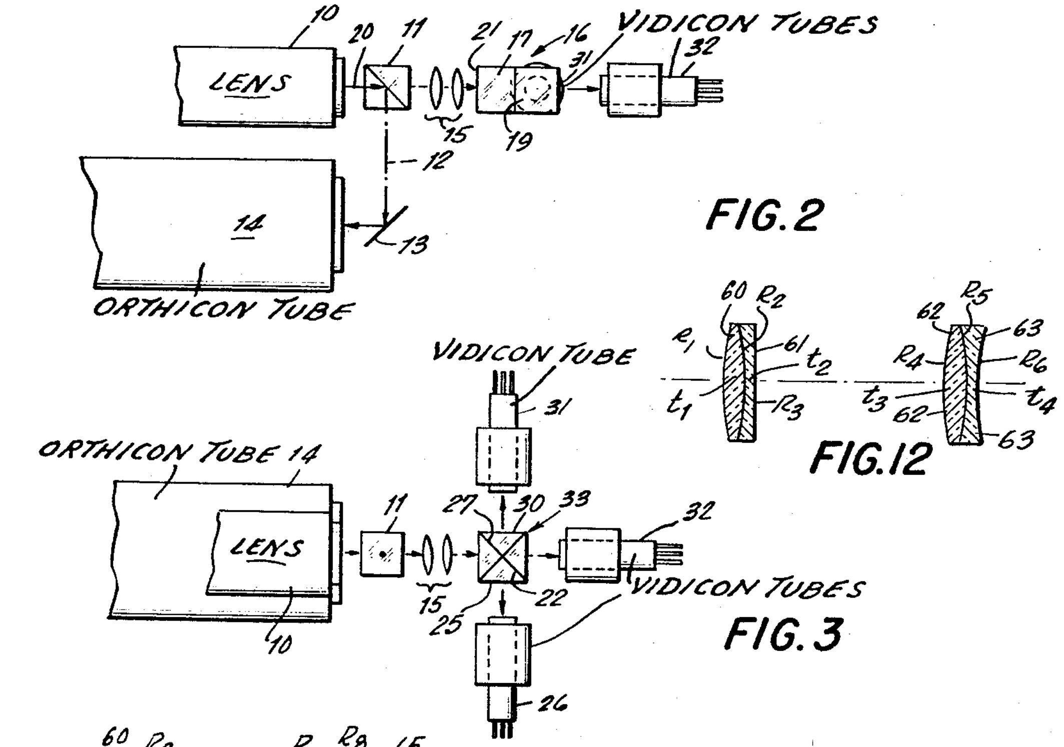
FIGURE 2 is a view in side elevation of the camera shown in FIGURE 1.
FIGURE 3 is a somewhat diagrammatic view in top plan of a further embodiment of the present invention.
FIGURES 12 and 12A are views in longitudinal section of two Petzval-type lens systems according to the present invention.
Figure 10:
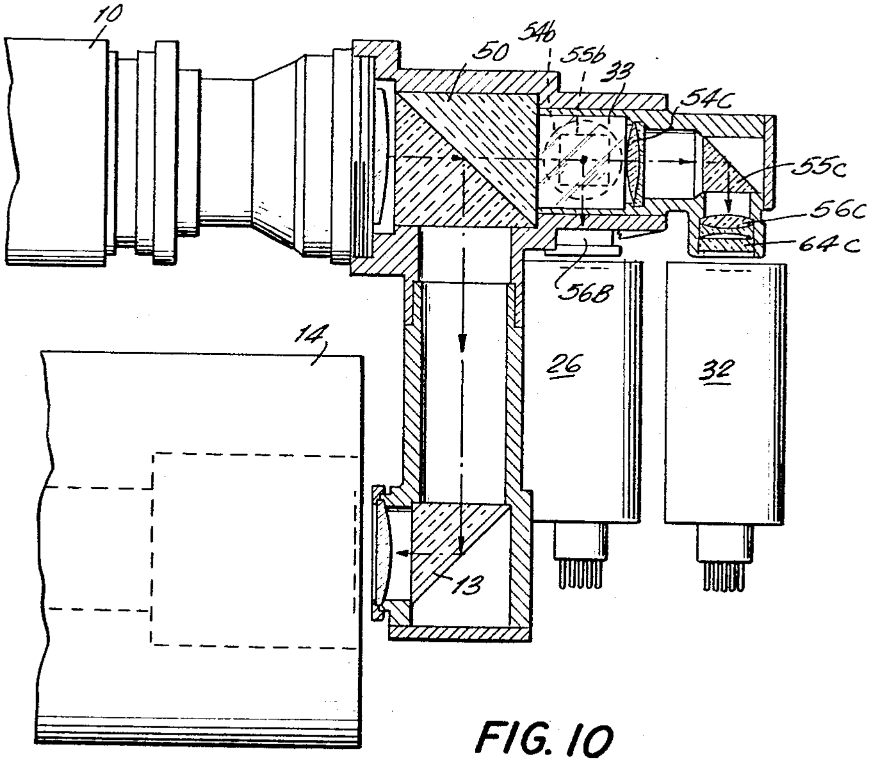
FIGURE 10 is a view in side elevation partly in section of the camera shown in FIGURE 9.

Referring to the drawings and particularly to FIGURES 1 and 2, 10 indicates a television camera lens having a long back focal length such as a varifocal lens system. Light from the lens 10 is directed into beam splitter 11 which is partially transmitting and partially reflecting. The reflected component of the light from the prism 11 is directed downwardly as indicated by the dashed lines 12, in FIGURE 2, toward a mirror or totally reflecting prism 13. The mirror 13 is angularly disposed so that the light 12 received by it is directed into an image-orthicon tube 14.

The orthicon tube 14 is particularly adapted to receive and transmit black and white television signals and is used for this purpose in the present invention. The orthicon tube 14 as shown in FIGURE 2 is of substantial size and its disposition within the camera housing provides problems when the camera must be moved about. Accordingly, in the present invention the orthicon tube 14 is disposed immediately below and parallel to the lens 10 so as to occupy a minimum amount of space and reduce the size of the camera housing (not shown) required to enclose the camera.

Figure 7:
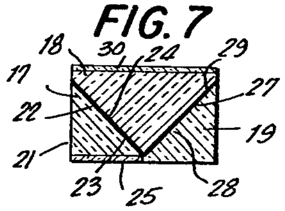
FIGURE 7 is a detailed view on an enlarged scale of the prism and filter arrangement shown in FIGURES 1, 2 and 4.

The remainder of the light coming from the lens 10 is transmitted by the prism 11 and passes through a positive reducing lens system 15 which adapts the size of the field to that of the smaller color receiving tubes. The light is then passed to a prism assembly 16 consisting of three triangular prisms 17, 18 and 19 (best shown in FIGURE 7).

The front face 21 of the prism block 16 is disposed in a plane normal to the optical axis 20 of the light entering the camera. The front face 21 comprises the entrance face of the prism 17. A dichroic filter 22, which may be of a type which will reflect blue light only, is laminated between the prisms 17 and 18, and supported by the diagonal surfaces 23 and 24, of the said prisms. The blue dichroic filter 22 reflects the blue compartment of the light incident thereon and transmits the remainder of the light entering the camera. The blue component is directed through the prism 17 by the filter 22, and traverses a blue corrective filter 25 which is cemented to the bottom or exit face of the prism 17 (see FIGURE 7). The light traversing the filter 25 is directed into a vidicon or other suitable tube 26 which is adjacent thereto. The small size of the vidicon tube 26 further lends itself to a reduction in overall camera size.

The light which is transmitted by the blue dichroic filter 22, traverses the prism 18, until it reaches a red dichroic filter 27, laminated between the diagonally disposed faces 28, and 29, of the prisms 18 and 19, respectively.

The red dichroic filter reflects the red component of the beam through the prism 18. As the light leaves the prism 18, it passes through a red corrective filter 30 which is secured to the exit face of the prism 18. The light coming through the corrective filter 30 enters the red vidicon tube 31.

The remainder of the light beam passes through the red dichroic filter 27 and consists of the green component only. The green component is received within a third vidicon tube 32 which is disposed on the optical axis 20 of the lens system 10. The manner in which the color television signal is transmitted from the vidicon tubes 26, 31, 32, is conventional and well known.

Figure 8:
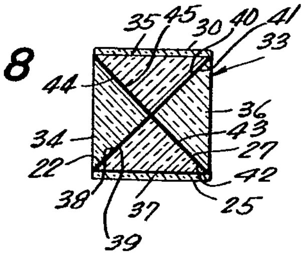
FIGURE 8 is a detailed view on an enlarged scale of the prism and filter arrangement shown in FIGURES 3, 5, 9, 10, 13, and 14.

In FIGURE 3 there is shown a color television camera similar to that in FIGURES 1 and 2 except that the prism structure is in the form of a block 33 made up of four identically shaped triangular prisms 34, 35, 36 and 37, as best shown in FIGURE 8. A blue dichroic filter 22 is cemented between the adjacent faces 38, 39, 40 and 41 of prisms 34, 35, 36 and 37. A red dichroic filter 27 is laminated between the adjacent faces 42, 43, 44, 45, of prisms 34, 35, 36 and 37, to form two diagonally disposed filter elements within the prism block 33. Light coming through the varifocal lens system 10 is directed into the prism block 33, where it falls upon the two dichroic filters 22 and 27. The blue element of the light beam is reflected by the blue dichroic filter 22, through the prism block 33, and into the vidicon tube 26. The red component of the light is reflected by the red dichroic filter 27, through the prism block 33, and into the vidicon tube 31. A blue corrective filter may be placed between the prism block 33, and the vidicon tube 26 as indicated at 25, in FIGURES 3 and 8. A red corrective filter 30 may be placed between the prism block 33 and the vidicon tube 31 as indicated in FIGURES 3 and 8. The remainder of the light entering the prism block 33 passes therethrough and emerges as the green component which then enters the vidicon tube 32.

In this embodiment of the invention the long back focal length of the varifocal lens system 10, together with the disposition of the orthicon tube 14 below the lens assembly 10, is employed.

Figure 4:
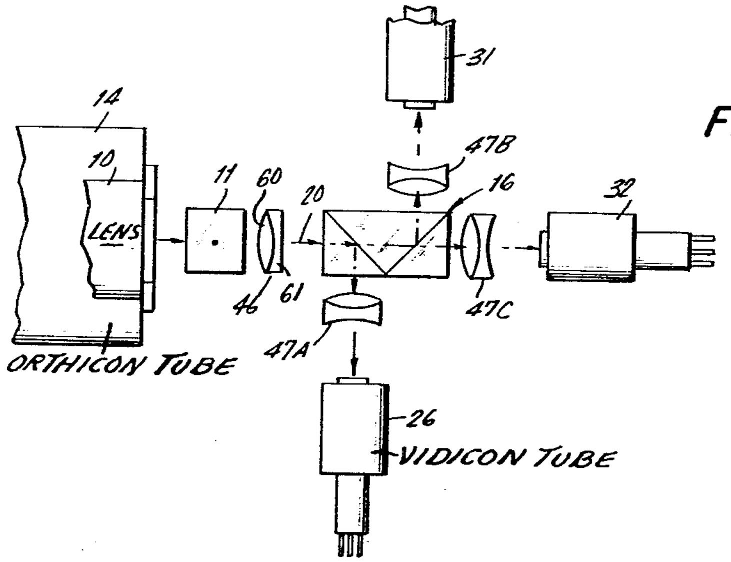
FIGURE 4 is a somewhat diagrammatic top plan view of still another embodiment of the present invention.

Referring to FIGURE 4 there is shown still another embodiment of the present invention in which a somewhat modified Petzval lens system is employed. In this embodiment the light passing through the beam splitter 11 is directed into the first doublet 46 of the Petzval-type lens system. The light is received within the prism block 16 from which it is transmitted in the manner set forth in connection with FIGURES 1 and 2, as three-color separated beams which are received within vidicon tubes 26, 31 and 32. The second doublet 47 of the modified Petzval lens system is disposed immediately between each of the vidicon tubes 26, 31, 32, and the prism block 16, as indicated at 47A, 47B and 47C, in FIGURE 4. The spaced arrangement of the Petzval-type lens system enables the prism block 16 to be disposed within the optical system of the Petzval lens assembly. This arrangement contributes to the overall compact distribution of the camera size and improves the nature of the image directed into the vidicon tubes.

Figures 5, 6:
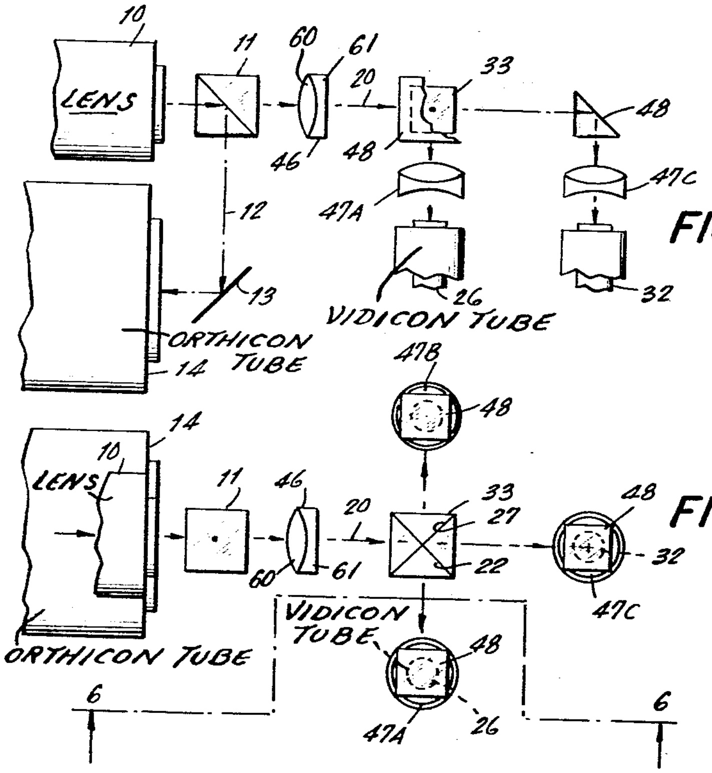
FIGURE 5 is a somewhat diagrammatic top plan view of still another embodiment of the present invention.
FIGURE 6 is a view taken on line 6—6 in FIGURE 5.

FIGURES 5 and 6 illustrate still another embodiment of the present invention in which the vidicon tubes are disposed normal to the optical axis 20, of the lens system 10, and are grouped around the prism block 33. It is to be understood that the prism block 16 may be substituted for the prism block 33 in this embodiment of the invention.

In order to achieve the normal disposition of the vidicon tube in the embodiment shown in FIGURES 5 and 6, a totally reflecting prism 48, is interposed between the exit faces of the prism block 33, and the second doublets 47A, 47B, 47C, of the Petzval lens systems. The prisms 48 direct the light leaving the prism block 33, downwardly into the vidicon tubes beneath each of the doublets 47A, 47B, 47C. In this manner, the overall length and width of the television camera is substantially reduced.

Figure 9:
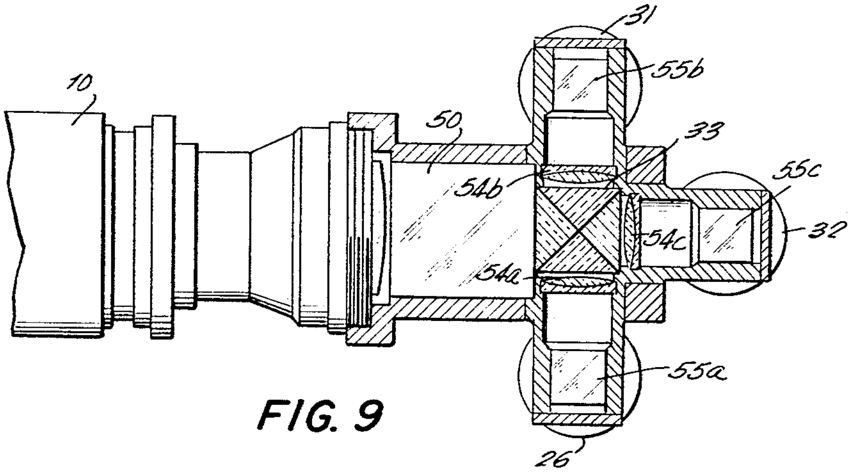
FIGURE 9 is a top plan view of a television camera according to the present invention using an orthicon and three vidicon tubes.
Figures 11, 14:
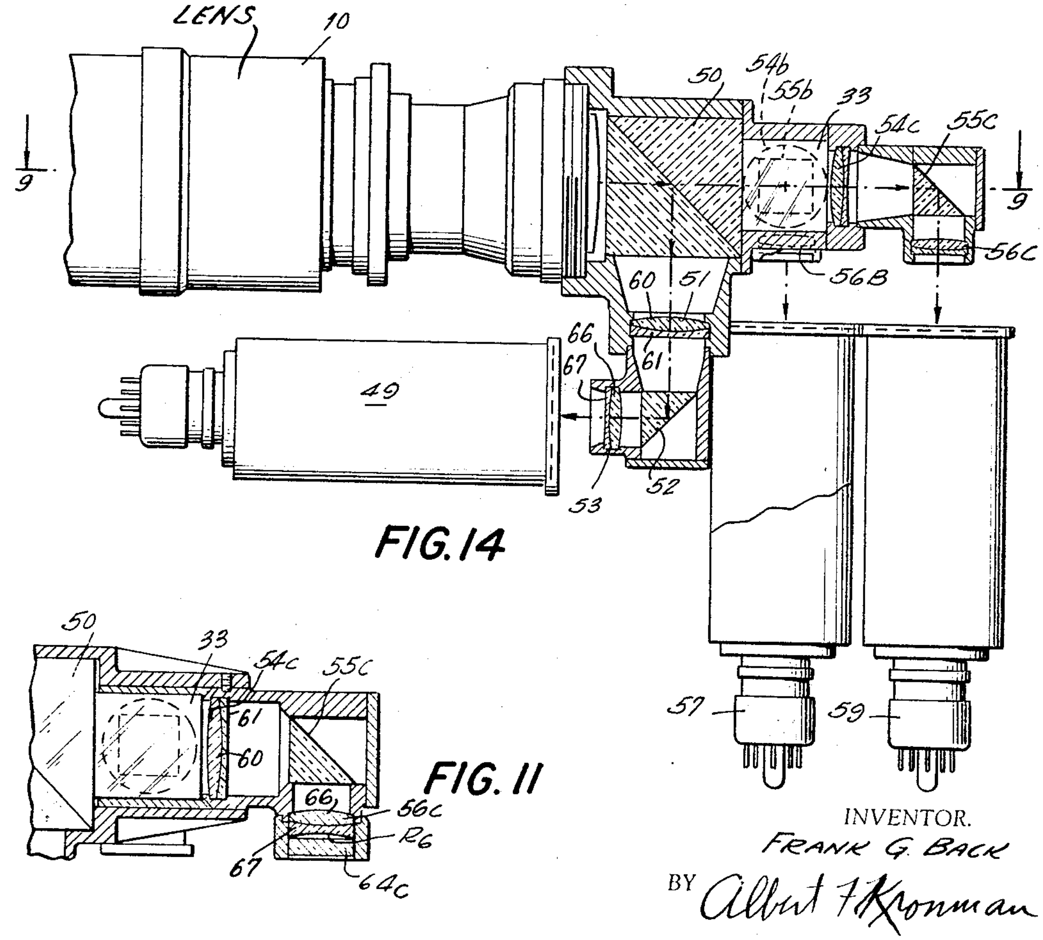
FIGURE 11 is a fragmentary cross-sectional view of a portion of the color television camera shown in FIGURES 9 and 10.
FIGURE 14 is a view in side elevation of the camera shown in FIGURE 13.

Referring to FIGURES 9, 10 and 11, there is shown a further embodiment of the present invention in which an orthicon and three vidicon television camera tubes are employed. The orthicon tube 14 which is substantially larger than the vidicon tubes 26, 31, 32, is disposed beneath and parallel to the lens system 10 in the manner previously set forth in connection with FIGURES 1–6. Light coming through the lens 10 is directed into a prism 50 which directs a portion of the light downwardly to a totally reflecting prism 13, which redirects it back parallel to the optical axis of the lens 10, and into the orthicon tube 14. The light transmitted by the beam splitter 50 is received within a prism block 33, which separates it into three color components in the manner hereinabove described in connection with FIGURES 5, 6 and 8. The light leaving each of the exit faces of the prism block 33 is directed through the first doublet of a Petzval lens system as shown at 54A, 54B and 54C. A totally reflecting prism 55A, 55B, 55C, is disposed in the path of the light coming from each of the first doublets and directs the light downwardly into one of each of the vidicon tubes 26, 31, 32. The second doublet 56A, 56B, 56C, of the Petzval type lens system is disposed between the totally reflecting prisms and the orthicon tubes.

A glass block 64A, 64B, 64C, best shown in FIGURES 10 and 11, is interposed between the last element of the Petzval lens doublet and the vidicon tube for reasons hereinafter more fully set forth.

The classical Petzval lens system employs two positive doublets with a cemented front element and a split-up rear element separated by a relatively large air space and with both crowns on the outside and the flints on the inside. Petzval lens systems are well corrected for spherical aberration, coma, distortion and color even at high relative apertures. However, these systems suffer from a considerable field curvature due to the fact that both components are positive and consist of low refractive crowns combined with high refractive flints. As a result of the inherent field curvature, Petzval lens systems have traditionally been used where the long focal length and small field angle were acceptable.

In the present invention there has been provided a Petzval type lens system which has a relatively flat field and which does not sacrifice the other advantages of this lens type. This field flattening is achieved by making the rear doublet from a high refractive crown in combination with a lower refractive flint. This structure could not heretofore have been used in a Petzval type lens system because one of the two doublets would have to be considerably over-corrected for spherical aberrations, particularly if both elements were to be cemented to facilitate assembly. It is of course, theoretically possible to achieve spherical over-correction in one doublet by means well known in the art, but such a correction would produce considerable zonal aberrations, particularly if it is computed for a high relative aperture.

In the present invention the front element is only moderately over-corrected and a deviation or deflection prism is introduced between the two doublets. This prism acts optically as a glass block of zero power. Due to its thickness, this glass block, nevertheless, introduces a sufficient amount of spherical aberration and coma, both with the right sign. As a result, the rear doublet can be made of high refractive crown and lower refractive flint without straining the corrective power of the front doublet to such a degree that heavy zonal aberrations result.

The modified Petzval system according to the embodiment of FIGURES 9–11, best shown in FIGURE 12, consists of two cemented doublets. The front doublet is identical for each of the embodiments disclosed herein. It consists of a substantially equiconvex positive component 60 cemented to a substantially planoconcave negative component 61.

The cemented doublet behind the prism consists of a positive lens 62 and a negative lens 63. A cemented doublet greatly simplifies the mounting and assembly of an optical system. On the other hand, it offers only limited correction possibilities. The ratio of the power of the positive component to the power of the negative component has to be kept substantially constant when the shape of the doublet is changed by bending. Otherwise the chromatic correction of this doublet is impaired. This limitation does not apply to the present invention, for two reasons. By placing the rear doublet close to the image plane the incidence height of axial rays is very small. Since the axial incidence height not only determines the longitudinal but also the lateral color contribution a change in the power ratio between the positive and negative component of the doublet affect its color contributions only very slightly.

Furthermore the three primary colors are transmitted separately. Therefore chromatic defects can be corrected electronically. The rear doublet of said Petzval system can therefore be nearly as readily manipulated for aberrational correction as if it were split up.

The rear doublet 47 of FIGURES 9, 10, and 11 (see FIGURE 12) has a first radius $R_4$ of more than one quarter but less than three quarters of the equivalent focal length of said rear doublet. The cemented surface has a radius $R_5$ of more than one third but less than two thirds of the absolute equivalent focal length of the rear doublet 47. The radius of the rear surface $R_6$ lies again between one quarter and three quarters of the equivalent focal length of the doublet. Or written as inequalities:

$$\tfrac{1}{4}F<R_4<\tfrac{3}{4}F$$

$$\tfrac{1}{3}F<|R_5|<\tfrac{2}{3}F$$

$$\tfrac{1}{4}F<R_6<\tfrac{3}{4}F$$

The back focal length of this system when used in conjunction with a main lens becomes very short and thereby causes mechanical difficulties. To overcome these difficulties a glass block 64 (see FIGURE 11) is inserted between the last surface $R_6$ and the image plane which lengthens the back focal length of the system without increasing the height at which the axial rays pass through the rear doublet 63.

Figure 13:
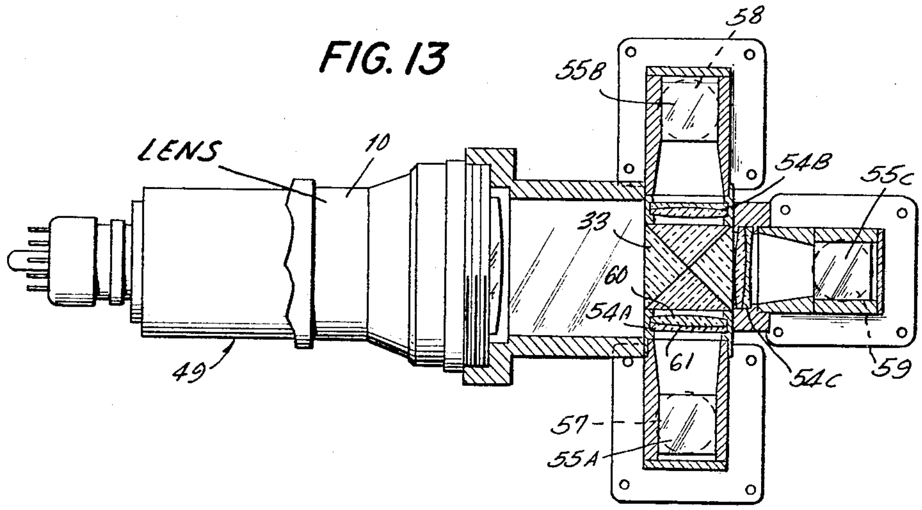
FIGURE 13 is a top plan view of a television camera according to the present invention using four tubes of the Plumbicon type.

Refering to FIGURES 13 and 14, there is shown still another embodiment of the present invention in which television camera tubes of the Plumbicon type are employed. These tubes are suited for both color and black and white use and are small in size. In this embodiment of the invention, one of the tubes indicated at 49 is used to receive the black and white information and is disposed immediately below and parallel with the camera lens 10, in the manner hereinabove set forth in connection with FIGURES 1–6. Light from the lens 10 is received by a beam splitter 50, which directs a portion of the light downwardly, through the first doublet of the Petzval type lens system indicated at 51. The light transmitted by the doublet 51 is received within a totally reflecting prism 52 which directs it into the tube 49 through the second doublet 53 of the Petzval lens system. The light transmitted by the beam splitter 50, enters a prism block 33, such as has been hereinabove described in connection with FIGURES 3, 5, 6 and 8. The light leaving each of the exit faces of the prism block 33 is received within the first doublet of a Petzval lens system as shown at 54A, 54B, and 54C. The light traversing the doublets 54A, 54B, 54C, which constitutes the color components of the image being received by the camera is directed into totally reflecting prisms 55A, 55B, 55C, which in turn lead the light into the second element 56A, 56B, 56C, of the Petzval lens system for each of the color receiving tubes 57, 58 and 59. The light leaving the second lens elements 56A, 56B, 56C, is received within the tubes 57, 58, 59, from which it is transmitted in the well known manner. It will be observed that by this arrangement of prisms, lenses and tubes, a very compact grouping of the necessary elements for a color television camera has been achieved.

Figure 12A:
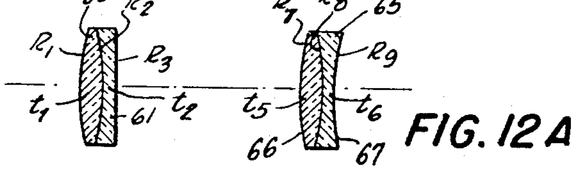

For the embodiment shown in FIGURES 13, 14, a weaker doublet 65, best shown in FIGURE 12A, is used as the rear element because the frame size of the Plumbicon is greater than that of the vidicon, and therefore requires less reduction. Here again the first and last radius, $R_7$, $R_9$, of this rear doublet is more than one quarter but less than three-quarters of the longer equivalent fomal length of this rear doublet while the middle (cemented) radius $R_8$, is more than one-eighth but less than one-half of the absolute value of said equivalent focal length or written as inequalities:

$$\tfrac{1}{4}F<R_7<\tfrac{3}{4}F$$

$$\tfrac{1}{8}F<|R_8|<\tfrac{1}{2}F$$

$$\tfrac{1}{4}F<R_9<\tfrac{3}{4}F$$

The incident height of the axial rays is small enough to permit correction of this doublet without disturbing the chromatic correction. Due to its lesser power it does not need an increase of its back focal length by insertion of a glass block. The rear doublet 65 is made up of a positive lens 66 and a negative lens 67. A specific example of a modified Petzval lens system suitable for the embodiments shown in FIGURES 9, 10 and 12, is as follows:

EXAMPLE I

| Lens No. | Glass | $N_d$ | V | Radii in mm. | Thickness ($t$) in mm. |
|---|---|---|---|---|---|
| 60 | BK-7 | 1.5168 | 64.20 | $R_1=86.410$<br>$R_2=-86.410$ | $t_1=5.000$ |
| 61 | F-2 | 1.6200 | 36.34 | $R_2=-86.410$<br>$R_3=$Plano | $t_2=2.000$ |
| Deviation Prism 48 | BK-7 | 1.5168 | 64.20 | Equivalent to glass block of 24 mm. thickness | |
| 62 | LAK-10 | 1.7200 | 50.31 | $R_4=22.640$<br>$R_5=-32.970$ | $t_3=7.000$ |
| 63 | F-2 | 1.6200 | 36.34 | $R_5=-32.970$<br>$R_6=28.050$ | $t_4=2.000$ |
| Glass Block 64 | SK-16 | 1.6204 | 60.29 | Plano | 6.50 |

EFL=58.237 mm.
BFL=6.129 mm.

wherein $N_d$ is the refractive index for D line, V is Abbé's dispersion number, BK is borosilicate crown, F is flint, LAK is lanthanum crown, SK is dense crown, R is radiuc curvature, and $t$ is axial thickness.

A specific example of a modified Petzval lens system suitable for the embodiments shown in FIGURES 13, 14 and 12A, is as follows:

EXAMPLE II

| Lens No. | Glass | $N_d$ | V | Radii in mm. | Thickness ($t$) in mm. |
|---|---|---|---|---|---|
| 60 | BK-7 | 1.5168 | 64.20 | $R_1=86.410$<br>$R_2=-86.410$ | $t_1=5.000$ |
| 61 | F-2 | 1.6200 | 36.34 | $R_2=-86.410$<br>$R_3=$Plano | $t_2=2.000$ |
| Deviation Prism 55 | BK-7 | 1.5168 | 64.20 | Equivalent to glass block of 24 mm. thickness | |
| 66 | LAK-10 | 1.7200 | 50.31 | $R_7=54.980$<br>$R_8=-40.580$ | $t_5=5.000$ |
| 67 | F-2 | 1.6200 | 36.33 | $R_9=-40.580$<br>$R_{10}=71.620$ | $t_6=2.000$ |

EFL=95.955.
BFL=19.088.

wherein $N_d$ is the refractive index for D line, V is Abbé's dispersion number, BK is borosilicate crown, F is flint, LAK is lanthanum crown, R is radius curvature, and $t$ is axial thickness.

It will be apparent from an examination of the drawings that the present invention permits a black and white television receiving camera to be constructed in which the orthicon tube is disposed immediately beneath and parallel to the camera lens to form a compact assembly. Thereafter, by the addition of the color separating prisms, and the color transmitting tubes the television camera can be converted to a color television camera. The compact arrangement and novel disposition of the lens and prism elements hereinabove set forth makes it possible to convert such a camera in a minimum amount of time and within a housing which is of acceptable size.

From the foregoing it will be apparent that there has been provided compact, highly efficient, light-weight color television cameras which lend themselves to a wide variety of uses and arrangements, and which will increase the mobility of prior art devices.

Having thus fully described the invention, what is claimed as new and desired to be secured by Letters Patent of the United States is:

1. An optical system for a color television camera having black and white and color image transmitting tubes therein comprising in combination, a camera lens of long back focal length, a beam splitter to receive the light from the lens and convert it into a first and second component, a black and white image transmitting tube disposed adjacent and substantially parallel to the lens, light reflecting means to receive the first light component from the beam splitter and direct it into the black and white image transmitting tube, a prism block to receive the second component from the beam splitter, means carried by the prism block to separate the second component into a plurality of distinct color components, a modified Petzval lens system comprising a first doublet and a second doublet air spaced from said first doublet, said prism block being disposed within the air space of the Petzval lens system, and a separate color image transmitting tube to receive each of the color components.

2. A device according to claim 2 in which each of the color image transmitting tubes has its own second doublet disposed between the tube and the prism block to constitute the second doublet of the modified Petzval lens system.

3. An optical system for a color television camera having black and white and color image transmitting tubes therein comprising in combination, a camera lens of long back focal length, a beam splitter to receive the light from the lens and convert it into a first and second component, a black and white image transmitting tube disposed adjacent and substantially parallel to the lens, light reflecting means to receive the first light component from the beam splitter and direct it into the black and white image transmitting tube, a prism block to receive the second component from the beam splitter, means carried by the prism block to separate the second component into a plurality of distinct color components, a deviation prism to receive each of the color components coming from the prism block and direct it into a path substantially normal to the optical axis of the lens, a modified Petzval lens system comprising a first doublet and a second doublet air spaced from said first doublet, said deviatiton prism being disposed within the air spaces of each of the Petzval lens systems, and a separate color image transmitting tube to receive each of the color components.

4. A device according to claim 3 in which the rear doublet is made up of a high refractive crown lens element and a lower refractive flint lens element.

5. A device according to claim 1 in which the rear doublet is a cemented doublet and has a first radius $R_4$ of more than one-quarter but less than three-quarters of the equivalent focal length F of said rear doublet, the cemented surface has a radius $R_5$ of more than one-third but less than two-thirds of the absolute equivalent focal length of the rear doublet, and the radius of the rear surface $R_6$ lies between one-quarter and three-quarters of the equivalent focal length of the doublet, or:

$$\tfrac{1}{4}F<R_4<\tfrac{3}{4}F$$

$$\tfrac{1}{3}F<|R_5|<\tfrac{2}{3}F$$

$$\tfrac{1}{4}F<R_6<\tfrac{3}{4}F$$

6. A device according to claim 3 in which the rear doublet is a cemented doublet having its first and last radius $R_7$, $R_9$, more than one-quarter but less than three-quarters of the longer equivalent focal length F of the rear doublet, and the cemented radius $R_8$ is more than one-eighth but less than one-half of the absolute value of said equivalent focal length or:

$$\tfrac{1}{4}F<R_7<\tfrac{3}{4}F$$

$$\tfrac{1}{8}F<|R_8|<\tfrac{1}{2}F$$

$$\tfrac{1}{4}F<R_9<\tfrac{3}{4}F$$

7. An optical system for a color television camera having black and white and color image transmitting tubes therein comprising in combination, a camera lens of long back focal length, a beam splitter to receive the light from the lens and convert it into a first and second component, a black and white image transmitting tube disposed adjacent and substantially parallel to the lens, light reflecting means to receive the first light component from the beam splitter and direct it into the black and white image transmitting tube, a prism block to receive the second component from the beam splitter, means carried by the prism block to separate the second component into a plurality of distinct color components, a modified Petzval lens system comprising a first doublet and a second doublet air spaced from the said first doublet, a deviation prism to receive each of the color components coming from the prism block and direct it into a path substantially normal to the optical axis of the lens, said prism block being disposed within the air space of the Petzval lens system, a separate color image transmitting tube to receive each of the color components, and a glass block between the last element of the Petzval lens system and the image transmitting tube to lengthen the back focal length of the system.

8. An optical system for a color television camera according to claim 7 in which the lens, prism and glass block elements conform to the following characteristics:

| Lens No. | Glass | $N_d$ | V | Radii in mm. | Thickness (t) in mm. |
|---|---|---|---|---|---|
| 60 | BK-7 | 1.5168 | 64.20 | $R_1$=86.410<br>$R_2$=−86.410 | $t_1$=5.000 |
| 61 | F-2 | 1.6200 | 36.34 | $R_2$=−86.410<br>$R_3$=Plano | $t_2$=2.000 |
| Deviation Prism 48 | BK-7 | 1.5168 | 64.20 | Equivalent to glass block of 24 mm. thickness | |
| 62 | LAK-10 | 1.7200 | 50.31 | $R_4$=22.640<br>$R_5$=−32.970 | $t_3$=7.000 |
| 63 | F-2 | 1.6200 | 36.34 | $R_5$=−32.970<br>$R_6$=28.050 | $t_4$=2.000 |
| Glass Block 64 | SK-16 | 1.6204 | 60.29 | Plano | 6.50 |

EFL=58.237 mm.
BFL=6.129 mm.

wherein $N_d$ is the refractive index for D line, V is Abbé's dispersion number, BK is borosilicate crown, F is flint, LAK is lanthanum crown, SK is dense crown, R is radius curvature, and *t* is axial thickness.

9. An optical system for a color television camera according to claim 3 in which the lens and prism elements conform to the following characteristics:

| Lens No. | Glass | $N_d$ | V | Radii in mm. | Thickness (*t*) in mm. |
|---|---|---|---|---|---|
| 60 | BK-7 | 1.5168 | 64.20 | $R_1=86.410$<br>$R_2=-86.410$ | $t_1=5.000$ |
| 61 | F-2 | 1.6200 | 36.34 | $R_2=-86.410$<br>$R_3=$Plano | $t_2=2.000$ |
| Deviation Prism 55 | BK-7 | 1.5168 | 64.20 | Equivalent to glass block of 24 mm. thickness | |
| 66 | LAK-10 | 1.7200 | 50.31 | $R_7=54.980$<br>$R_8=-40.580$ | $t_5=5.000$ |
| 67 | F-2 | 1.6200 | 36.33 | $R_9=-40.580$<br>$R_{10}=71.620$ | $t_6=2.000$ |

EFL=95.955.
BFL=19.088.

wherein $N_d$ is the refractive index for D line, V is Abbé's dispersion number, BK is borosilicate crown, F is flint, LAK is lanthanum crown, R is radius curvature, and *t* is axial thickness.

10. An optical system for a color television camera having black and white and color image transmitting tubes therein comprising in combination, a camera lens of long back focal length, a beam splitter to receive the light from the lens and convert it into a first and a second component, a black and white image transmitting tube disposed adjacent and substantially parallel to the lens, light reflecting means to receive the first light component from the beam splitter and direct it into the black and white image receiving tube, a prism block to receive the second component from the beam splitter, means carried by the prism block to separate the second component into a plurality of distinct color components, a modified Petzval lens system comprising a first doublet and a second doublet air spaced from said first doublet to receive each of the color components, a deviation prism within each of the air spaces, a glass block of zero power on the exit side of the Petzval lens system and a separate color image transmitting tube to receive the color component transmitted to each glass block.

11. An optical system according to claim 10 in which the black and white image transmitting tube is an orthicon tube and the color image transmitting tubes are vidicon tubes.

12. An optical system according to claim 3 in which the black and white and color image transmitting tubes are of the Plumbicon type.

References Cited

UNITED STATES PATENTS 1,371,970 3/1921 Furman ---------------- 88—1
2,808,456 10/1957 Wittel ---------------- 178—5.4
2,971,051 2/1961 Back ---------------- 178—5.4
3,017,454 1/1962 James et al. ---------- 178—5.4
3,167,681 1/1965 Dischert ---------- 178—5.4 X JOHN W. CALDWELL, *Acting Primary Examiner.*

DAVID G. REDINBAUGH, *Examiner.*

J. A. O'BRIEN, *Assistant Examiner.*